July 30, 1963 — P. A. MANOR — 3,099,287
POWER OPERATION FOR VALVES
Filed Dec. 27, 1960 — 3 Sheets-Sheet 2
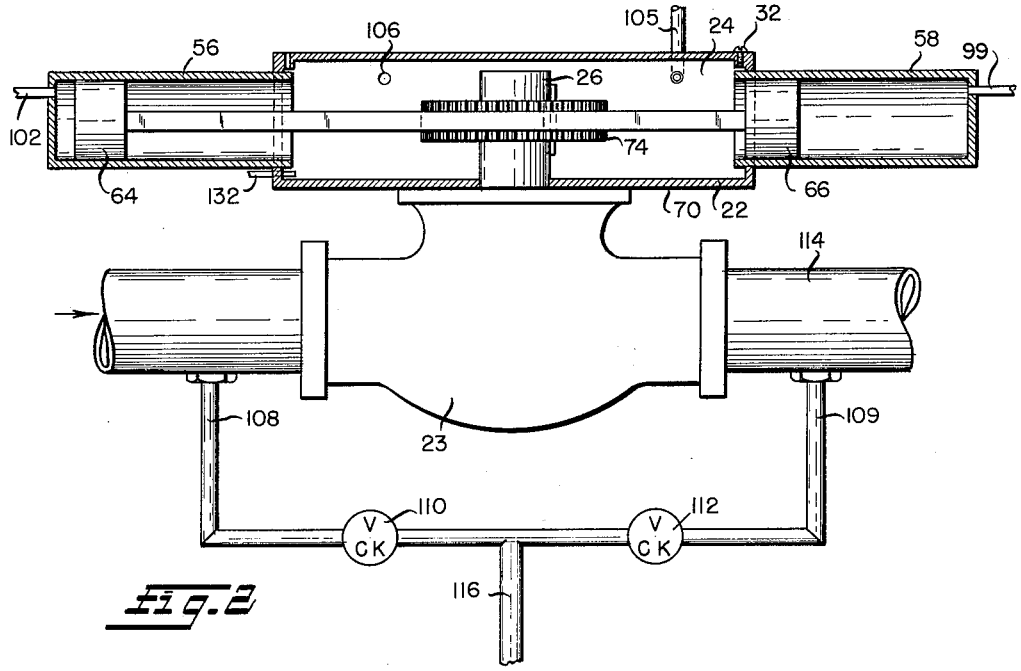
Fig. 2
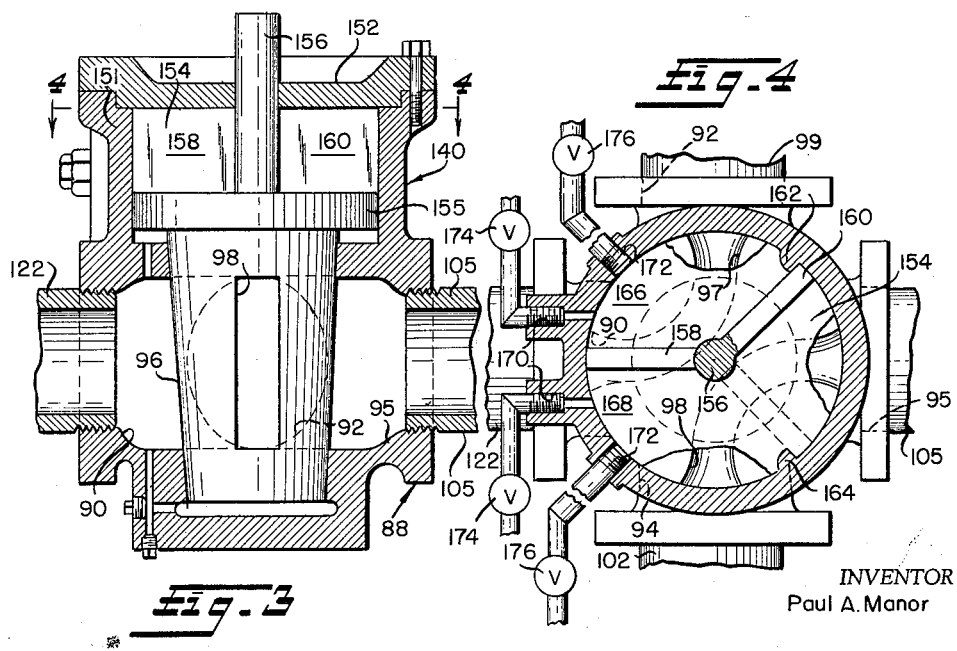
Fig. 3
Fig. 4
INVENTOR
Paul A. Manor
BY Strauch, Nolan & Neale
ATTORNEYS

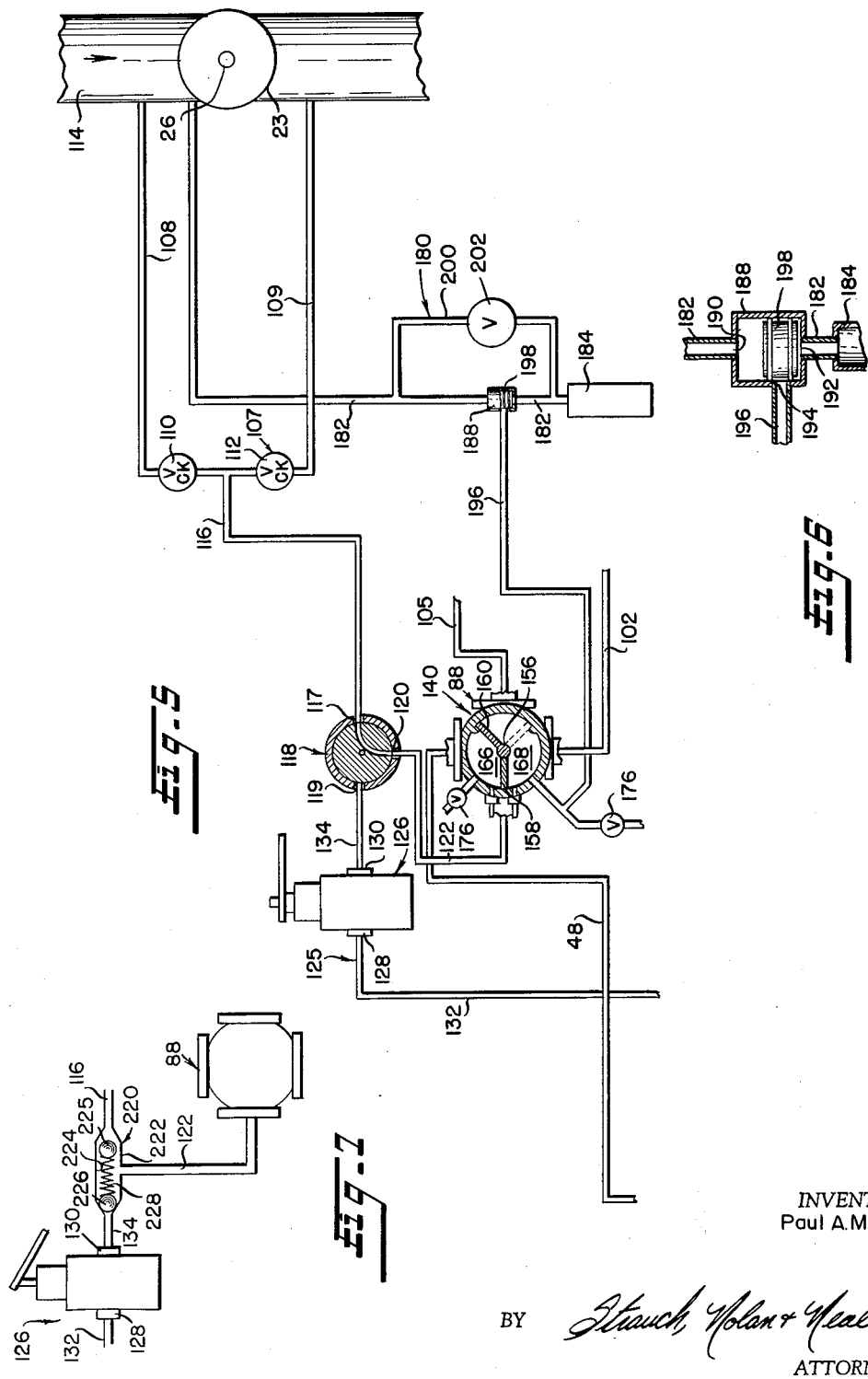

U̲n̲i̲t̲e̲d̲ S̲t̲a̲t̲e̲s̲ P̲a̲t̲e̲n̲t̲ O̲f̲f̲i̲c̲e̲

3,099,287
Patented July 30, 1963

3,099,287
POWER OPERATION FOR VALVES
Paul A. Manor, Pittsburgh, Pa., assignor to Rockwell Manufacturing Company, Pittsburgh, Pa., a corporation of Pennsylvania
Filed Dec. 27, 1960, Ser. No. 78,376
6 Claims. (Cl. 137—456)

The present invention relates to power operation for opening and closing valves primarily of the type having a rotatable operating stem and more particularly to improved power fluid control systems for controlling the operation of a power piston valve operator of the type which is actuatable by application of fluid pressure.

In power valve operators of the type considered herein, a fluid pressure motor unit having at least one fluid pressure actuatable power member mechanically connected to the rotatable stem of a pipeline valve member is operable to rotate the valve stem between valve open and closed positions by controlled application of pressure fluid to the power member. Pressure fluid for powering the fluid motor of the valve operator customarily is obtained from the pipeline in which the valve is disposed since the pipeline usually provides for a readily available and adequate fluid supply source.

One of the basic shortcomings of valve operators of this type is that the pipeline valve cannot be power operated when there is a failure or appreciable reduction in pipeline pressure.

In an effort to overcome this shortcoming of these prior art valve operators, it has been proposed to provide for stand-by operators for manual operation of the valve when the pipeline fluid pressure fails or is not available. Prior constructions provide for a handwheel for operating the valve stem often through suitable gearing, the operation of which involves substantial and time-consuming manual effort. In other prior stand-by arrangements, a separate and independent auxiliary fluid pressure power source is employed to operate the valve in the event of failure of the main power source. Such systems, however, are extremely complex involving the manipulation of several controls and often involving an appreciable duplication of parts, thus making the cost of an emergency operator substantially high and inordinate and consequently undesirable in moderate or low cost piping installations.

The present invention generally contemplates a simplified piston type power operator for opening and closing a pipeline valve and which is selectively powered by pipeline pressure fluid or by operation of a hydraulic hand pump. The pressure fluid is applied to the outer ends of the operator pistons and is discharged into a sump compartment in the operator which vents the fluid to atmosphere if it is gas or collects the fluid if it is liquid to furnish the manual pump with a separate liquid supply source to facilitate power operation of the valve in the event that the pipeline pressure is not sufficiently high to actuate the operator.

The present invention further contemplates the provision of a reversing valve which is operable to apply pressure fluid to the ends of selected pistons of the operator thereby causing rotation of the valve stem in a predetermined direction. In one embodiment of the present invention, the reversing valve is pneumatically operated and in a further embodiment, the reversing valve is automatically shifted to a position for closing the pipeline valve whenever the pipeline pressure is decreased by a predetermined magnitude or at a predetermined rate. This eliminates the necessity of manually operating relatively large sized reversing valves which normally are power operated and which cannot be quickly and easily hand manipulated.

Accordingly, it is the primary object of the present invention to provide for a novel pressure actuated fluid motor operator for opening and closing a pipeline valve and which is capable of being selectively powered by pressure fluid from the pipeline or by a manually operable pump.

Another object of the present invention is to provide a novel power valve operator having a pressure fluid operated motor which is capable of being interchangeable and selectively operated by a main power source and by a stand-by hand pump by manipulation of a single control valve.

Still another object of the present invention is to provide a novel power operator which is operable to open and close a pipeline valve and which comprises a fluid motor unit powered to rotate the pipeline valve stem by readily interchangeable and selective application of pipeline pressure fluid or by operation of a hand pump wherein fluid at the ends of pistons of the fluid motor unit is discharged into a reservoir compartment which vents gas but collects liquid for use in supplying the hand pump.

A further object of the present invention is to provide a novel power piston type valve operator which is operable to open and close a rotary type pipeline valve and which is selectively powered by application of pipeline pressure fluid or by operation of a hand pump wherein the casing of the operator forms a sump compartment to collect liquid discharged from the power pistons for furnishing a reservoir supply source for the hand pump.

A more specific object of the present invention is to provide a four-piston valve operator which is powered to rotate a valve stem in opposite directions by selective application of pipeline pressure fluid or by operation of a hydraulic hand pump and which has a sump for receiving the fluid discharged from the ends of the pistons wherein gas introduced into the sump is vented to atmosphere and liquid is collected for use in supplying the hand pump.

A further specific object of the present invention is to provide a novel piston type power operator for operating a rotary type pipeline valve and having a reversing valve for controlling the application of pressure fluid to the operator pistons whereby to selectively turn the pipeline valve stem in one direction or the other, a fluid pressure pipeline circuit for applying pipeline pressure fluid to power the operator pistons, an auxiliary manual pump hydraulic circuit for selectively alternately supplying pressure fluid from a manually operable pump to power the operator pistons when the pipeline pressure fails or is not available, and a discharge reservoir which receives fluid discharged from both the pipeline and auxiliary circuits and which only collects and furnishes a supply of liquid to the manual pump.

Another object of the present invention is to provide a novel power operator as in the preceding object wherein the reversing valve is pneumatically operated.

Still another object of the present invention is to provide a novel power operator as in the preceding object wherein the pneumatically controlled reversing valve is automatically conditioned for closing the pipeline valve when the pressure of the fluid in the pipeline falls below a predetermined magnitude or falls at greater than a predetermined rate.

Further objects of the invention will appear as the description proceeds in connection with the appended claims and the annexed drawings wherein:

FIGURE 2 is a partially sectioned elevational view of the power operator and system shown in FIGURE 1;

FIGURE 3 is a section through a power operated reversing valve incorporated into the system shown in FIG- URE 1 and according to a further embodiment of the invention;

FIGURE 4 is a section taken substantially along lines 4—4 of FIGURE 3;

FIGURE 5 is a diagrammatic view showing a fluid control system for the power operated reversing valve of FIGURE 3 according to a further embodiment of the present invention; and FIGURE 6 is a fragmentary enlarged view showing the pressure operated shuttle valve member of FIGURE 5.

FIGURE 7 is a fragmentary diagrammatic view similar to FIGURE 1 and showing a modified fluid control system.

Figure 1:
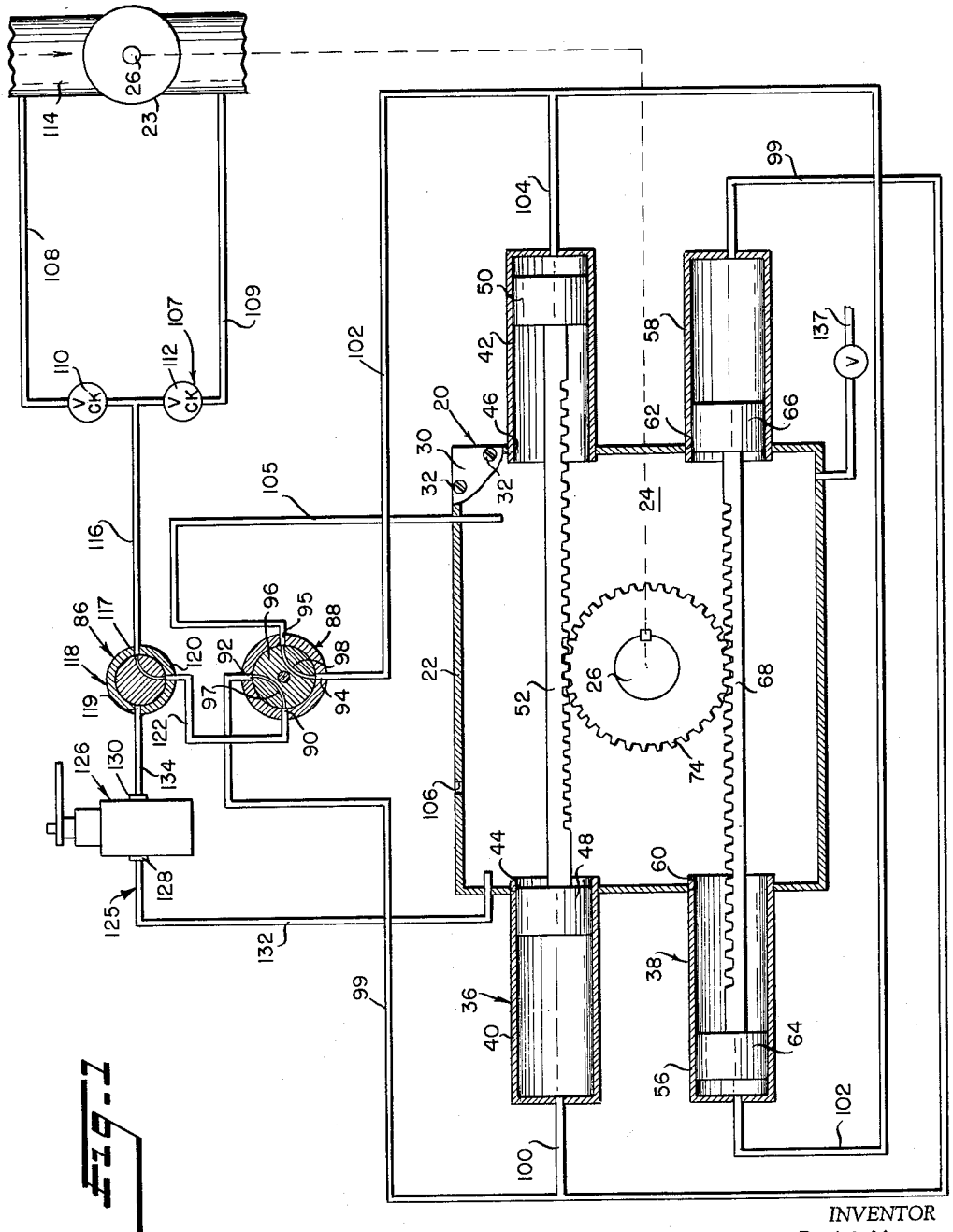
FIGURE 1 is a diagrammatic view showing a fluid control system for a power valve operator according to a preferred embodiment of the invention.

Referring now to the drawings and more particularly to FIGURES 1 and 2 showing the construction according to the preferred embodiment of the present invention, the reference numeral 20 generally designates a valve operator which comprises a hollow integral cast housing 22 adapted to be fixedly mounted on the head of a valve casing of a pipeline plug type valve 23 and forming a reservoir compartment 24 through which an upwardly projecting rotatable valve actuating stem 26 of valve 23 projects. Housing 22 is formed with a top opening which is enclosed by a cover plate 30 removably secured to housing 22 as by screws 32 to provide access to the component parts of the operator.

Supportingly mounted on housing 22 are two parallel oppositely acting fluid motor units 36 and 38. Motor unit 36 comprises a pair of aligned axially spaced cylinders 40 and 42 rigidly mounted with a fluid tight fit in aligned opposed openings 44 and 46 respectively formed in opposite sidewalls of housing 22. Mounted for reciprocal movement in cylinders 40 and 42, respectively, are a pair of single acting power piston members 48 and 50 which are rigidly interconnected for simultaneous operation by a gear rack 52 extending coaxially through openings 44 and 46 and through housing compartment 24 to one side of valve stem 26.

Motor unit 38 is identical to motor unit 36 and comprises a pair of aligned axially spaced cylinders 56 and 58 rigidly mounted with a fluid tight fit in opposed aligned openings 60 and 62 respectively formed in the opposite side walls of housing 22 such that the common axis of cylinders 56 and 58 is in the same horizontal plane with and parallel to the common axis of cylinders 40 and 42 of motor unit 36. Mounted for reciprocal movement in cylinders 56 and 58 are a pair of single acting power piston members 64 and 66 which are rigidly interconnected for simultaneous operation by a gear rack 68 extending coaxially through openings 60 and 62 in parallel spaced apart relationship to rack 52 on the opposite side of valve stem 26.

Valve stem 26 which may or may not be integral with the valve plug (not shown) of valve 23, projects upwardly from the valve plug through a pilot bore (not shown) formed in the bottom wall 70 of housing 22 to a position centrally located in compartment 24 between racks 52 and 68. Within housing 22, a pinion gear 74, which is fixedly secured to stem 26, is in constant meshing engagement with racks 52 and 68 at diametrically opposite sides of the gear and valve stem axis. By this construction, as racks 52 and 68 are power shifted in opposite reciprocal paths, a torque couple is applied to gear 74 and consequently to valve stem 26 to selectively turn valve stem 26 in one direction or the other for opening and closing valve 23.

With continued reference to FIGURE 1, the outer ends of cylinders 40, 42, 56 and 58 are closed and the inner ends are open in communication with reservoir compartment 24 for a purpose as will become apparent as the description proceeds. Thus, by introduction of pressure fluid into cylinders 40 and 58 and by exhaust of any pressure fluid in cylinders 42 and 56, motor units 36 and 38 are powered in opposite directions to apply a torque couple to valve stem 26 thereby rotating the stem in a clockwise direction as viewed from FIGURE 1. Correspondingly, by introduction of pressure fluid into cylinders 56 and 42 and by exhaust of any pressure fluid in cylinders 40 and 58, a torque couple is applied to valve stem 26 to rotate the stem in a counterclockwise direction. The displacement of the power pistons of motor units 36 and 38 to rotate valve stem 26 in either direction is sufficient to effect the desired angular rotation of valve stem 26 for opening and closing valve 23, which in the present embodiment is 90°. The assembly of valve 23 usually embodies positive stops for valve stem rotation which limit the piston stroke and prevent the power pistons of motor units 36 and 38 from moving beyond predetermined extreme axial positions in their respective cylinders.

In order to selectively control the introduction of pressure fluid into cylinders 40, 42, 56 and 58, to facilitate power operation of valve stem 26, a control system 86 is provided and comprises a manually operable reversing valve 88. Valve 88 is of the type having an inlet port 90, two distinct actuating ports 92 and 94, an exhaust port 95 and a manually rotatable valve plug 96 formed with independent plug passages 97 and 98. Valve 88 is operable to one of three positions: (1) a "neutral" position in which there is no transfer of fluid from inlet port 90 to actuating ports 92 and 94; (2) a first "operative" position in which inlet port 90 is connected to port 92 by plug passage 97 and exhaust port 95 is connected to port 94 by plug passage 98; and (3) a second "operative" position in which inlet port 90 is connected to port 94 by plug passage 98 and exhaust port 95 is connected to port 92 by plug passage 97. Valves of this type are sometimes referred to as "four-way valves" and are of conventional construction as shown in United States Letters Patent No. 1,263,778 issued April 23, 1918 to C. W. Larner.

Port 92 is connected for fluid communication with cylinder 58 by means of a conduit 99 which opens into the outer end of cylinder 58. A branch conduit 100 intersecting conduit 99 extends into the outer end of cylinder 40 to establish fluid communication between cylinder 40 and port 92. Similarly, port 94 is connected for fluid communication with cylinder 56 by means of a conduit 102 which opens into the outer end of cylinder 56; and a branch conduit 104 intersecting conduit 102 and extending into the outer end of cylinder 42, establishes fluid communication between port 94 and cylinder 42. By this reversing valve and conduit construction, pressure fluid delivered to reversing valve port 92 is transmitted simultaneously to cylinders 40 and 58, and fluid in cylinders 42 and 56 is returned, by concomitant axial displacement of pistons 50 and 64, to exhaust port 95 under the control of valve 88 when in a selected one of its two "operative" positions. When valve 88 is shifted to its other "operative" position, pressure fluid delivered to port 94 is transmitted simultaneously to cylinders 42 and 56, and fluid in cylinders 40 and 58 is returned, by concomitant axial displacement of pistons 48 and 66, to exhaust port 95, thus driving fluid motor units 36 and 38 simultaneously in opposite directions.

Exhaust port 95 is connected by means of a conduit 105 to reservoir compartment 24 in housing 22. Compartment 24 is provided with a vent opening 106 near the top thereof so that gases exhausted to the compartment are vented to atmosphere but liquids exhausted to the compartment are collected therein for use as a standby source of fluid supply for a purpose as will become apparent.

By the foregoing fluid pressure motor unit structure, it is apparent that leakage of fluid past pistons 48, 50, 64 and 66 and through the open ends of cylinders 40, 42, 56 and 58 is transmitted to compartment 24 where the fluid is collected if it is a liquid or exhausted to atmosphere if it is a gas. Consequently, leakage of liquid past the pistons is collected in compartment 24 for a purpose as will become apparent.

In order to deliver pressure fluid to valve 88 a circuit 107 is provided and comprises separate conduits 108 and 109 respectively containing one-way check valves 110 and 112. Conduits 108 and 109 are connected respectively to the upstream and downstream side of a pipeline 114 in which valve 23 is disposed and the outlet ends of conduits 108 and 109 are connected by a conduit 116 to an inlet port 117 of a conventional manually operable two-way valve 118 having a further inlet port 119 and a single outlet port 120. Outlet port 120 is connected by a conduit 122 to inlet port 90 of reversing valve 88. Valve 118 is conventionally operable to selectively connect either port 117 or port 119 to outlet port 120.

During normal operation, pressure fluid, such as natural gas or liquid petroleum in various states, in pipeline 114 is supplied from either side of valve 23 through conduits 108 and 109 depending upon the direction of fluid flow through pipeline 114. The fluid flowing through conduit 108 or 109 is transferred through conduit 116 to valve 118 and through conduit 122 to reversing valve 88 which controls the delivery of pressure fluid to selectively actuate fluid motor units 36 and 38 as hereinbefore described.

In the event that pressure fluid in pipeline 114 is not available or the magnitude of the pressure of fluid in pipeline 114 is too low to power the motor units 36 and 38, a stand-by pump circuit 125 is provided and contains a manually operable pump 126 of any standard construction having an inlet port 128 and a pressure discharge port 130. Inlet port 128 is connected by a conduit 132 to reservoir compartment 24 in housing 22 to facilitate the delivery of low pressure supply liquid collected in compartment 24 to pump 126. Discharge port 130 is connected by means of a conduit 134 to the inlet port 119 of two-way valve 118.

By this construction, it will be appreciated that valve 118 is selectively operable to alternatively connect pipeline circuit 107 to valve 88 or stand-by pump circuit 125 to valve 88.

In operation, valve 118 is normally set, as shown in FIGURE 1, to connect inlet port 117 with outlet port 120 to disconnect stand-by pump circuit 125 for reversing valve 88 and to deliver pressure fluid in pipeline 114 through conduits 108, 116 and 122 to valve 88. Valve 88 is selectively manually operated to control delivery of pressure fluid to cylinders 40 and 58 or to cylinders 42 and 56 to actuate motor units 36 or 38 for turning valve stem 26. The fluid discharged from cylinder 40 and 58 or from 42 and 56 is delivered to reservoir compartment 24. If the fluid delivered from pipeline 114 is a gas, it is discharged through vent 106 in reservoir compartment 24 after it is exhausted from the cylinders of units 36 and 38. If the fluid delivered from pipeline 114 is a liquid, it is collected in reservoir compartment 24 as it is discharged from the cylinders of motor units 36 and 38 for furnishing a ready supply of liquid normally at atmospheric pressure to pump 126. Liquid overflow in compartment 24 is discharged through a valved conduit 137 to waste or returned back to pipeline 114.

When pressure fluid is not available in pipeline 114 or if the pressure of the fluid in pipeline 114 is not high enough to power motor units 36 and 38, two-way valve 118 is manually manipulated to connect inlet port 119 to outlet port 120 thereby connecting the stand-by pump circuit 125 to reversing valve 88. By manual operation of pump 126, liquid in reservoir compartment 24 is drawn from compartment 24 and delivered by pump 126 under pressure through valve 118 and conduits 134 and 122 to reversing valve 88 which is selectively operable as hereinbefore described to facilitate selective operation of fluid motor units 36 and 38 by application of pressure liquid thereto.

From the foregoing detailed description, it is apparent that the present invention provides a simplified control system selectively operable by a main source of power from pipeline 114 or by a stand-by pump 126 by manipulation of a single control valve 118 without duplication of component parts and by providing for a collection reservoir 24 which collects liquid but vents gas so that a supply source of liquid normally at atmospheric pressure is readily available for supplying the stand-by pump 126. By this construction, it will be appreciated that the auxiliary pump circuit 125 does not require a separate source of supply to be maintained independently of the supply source of liquid for pump 126 when liquid is being transferred through pipeline 114.

FIGURES 3 and 4 illustrate a further embodiment of the present invention wherein a power valve operator 140 is provided for conditioning reversing valve 88. Operator 140 may be of any standard conventional construction such as that shown in United States Letters Patent No. 1,263,778 issued April 23, 1918 to C. W. Larner and may be powered by the pressure of the gas or fluid in pipeline 114 or in the conduit in which it is installed or by the pressure of gas or fluid supplied from an independent source.

With continued reference to FIGURES 3 and 4, the casing of valve 88 is provided with an upwardly directed cylindrical extension 151 which together with a top cover 152 forms a fluid tight chamber 154 which is closed at its bottom by a flat annular plate 155 mounted rigid with the valve operating stem 156. Stem 156 may be extended beyond cover 152 to facilitate manual operation thereof. Rigidly fixed to cover plate 152 is a partition 158 which extends radially between stem 156 and the interior cylindrical wall surface of casing extension 151. Valve stem 156 extending upwardly through chamber 154 carries a radially extending abutment 160 which is swingable with stem 156 between inwardly extending stops 162 and 164 formed on the interior cylindrical surface of casing extension 151.

By means of this structure, partition 158 and abutment 160 divide chamber 154 into two separate substantially fluid tight compartments 166 and 168. Each of the compartments 166 and 168 is provided with an inlet port 170 and an outlet port 172 to facilitate selective introduction of pressure fluid into compartments 166 and 168 for swinging abutment 160 and thereby rotating stem 156 in opposite directions. Ports 170 each are provided with a valve 174 by means of which the flow of pressure fluid into compartments 166 and 168 may be throttled to any desired extent. Outlet ports 172 are provided with valves 176 to facilitate control of the discharge of fluid in compartments 166 and 168.

By this construction, it will be appreciated that introduction of pressure fluid into compartment 166 and exhaust of any fluid in compartment 168 causes abutment 160, and consequently valve stem 156, to be turned in a clockwise direction as viewed from FIGURE 4. Correspondingly, introduction of pressure fluid into compartment 168 and exhaust of any fluid in compartment 166 swings abutment 160 and consequently turns valve stem 156 in a counterclockwise direction.

With continued reference to FIGURES 3 and 4, valve stem 156 is shown to be fixedly secured to plug 96 of reversing valve 88. With stem 156 in its extreme counterclockwise position, as shown in FIGURE 4, plug 96 is positioned so that port 94 is connected by passage 98 to port 95 and port 90 is connected by passage 97 to port 92. In this position of reversing valve parts, it will be appreciated that reversing valve 88 is conditioned to cause clockwise rotation of pipeline valve stem 26 for closing valve 23 upon application of pressure fluid through inlet port 90 to cylinders 40 and 58 as hereinbefore described in connection with the embodiment of FIGURES 1 and 2.

By now exhausting fluid from operator compartment 168 and introducing pressure fluid into compartment 166, abutment 160 and stem 156 are swung in a clockwise direction, as viewed from FIGURE 4, to rotate plug 96 to a position where port 90 is connected by passage 98 to port 94, and port 92 is connected by passage 97 to port 95, thereby conditioning reversing valve 88 for opening pipeline valve 23 as previously described.

FIGURES 5 and 6 illustrate a further embodiment wherein a fluid system 180 for automatically powering the operator 140 of FIGURES 3 and 4 to condition reversing valve 88 for closing valve 23 in response to a predetermined reduction of pressure in pipeline 114. System 180 comprises a conduit 182 interconnecting pipeline 114 and a reservoir 184 which is adapted to collect fluid under high pressure.

As best shown in FIGURE 6, conduit 182 is provided with an enlarged cylindrical chamber 188 which is positioned between reservoir 184 and pipeline 114 and which is formed with coaxial top and bottom ports 190 and 192 and a side port 194 adjacent to the bottom of the chamber. Port 190 is in fluid communication with pipeline 114 and port 192 is in fluid communication with reservoir 184. A conduit 196 is connected at one end to port 194 and at its other end to inlet port 172 of operator compartment 168 to establish fluid communication between chamber port 194 and operator compartment 168. Slidably mounted for axial displacement in chamber 188 is a cylindrical shuttle valve member 198 which is axially shiftable by pressure differentials acting across the flat top and bottom faces thereof.

In the position shown in FIGURE 6, valve member 198 is at the bottom of chamber 188 where it concomitantly seals ports 192 and 194. The axial length of valve member 198 is such that when it is raised to a position near the top of chamber 188, port 190 is closed off from fluid communication with the interior of chamber 188 and ports 192 and 194 are open for fluid communication with the interior of chamber 188. By this construction it will be appreciated that with valve member 198 in the position shown in FIGURE 6, fluid communication between reservoir 184 and operator compartment 168 is dis-established. When valve member 198 is axially shifted to its upper position near the top of chamber 188, fluid communication is established beween reservoir 184 and operator compartment 168.

In order to charge reservoir 184, a by-pass conduit 200 containing a valve 202 is provided for and is connected at one end to conduit 182 between chamber 188 and pipeline 114 and at the other end to conduit 182 between reservoir 184 and chamber 188. Thus, by manipulation of valve 202, reservoir 184 is charged from pressure fluid in pipeline 114 and by closing off valve 202, reservoir 184 is sealed off holding the pressure fluid therein in readiness for stand-by operation of operator 140 to condition valve 88 for closing pipeline valve 23.

In operation of system 180, reversing valve 88 is assumed to be conditioned for applying fluid to motor units 36 and 38 for opening pipeline valve 23. In such position, stem 156 is swung to its extreme clockwise position with abutment 160 in surface engagement with stop 164 to thereby establish fluid communication between valve ports 92 and 95 and between valve ports 90 and 94 to facilitate the application of pressure fluid to the ends of pistons 50 and 64. Outlet valve 176 of compartment 166 is opened to relieve pressure fluid in compartment 166 and inlet valves 174 of both compartments 166 and 168 are closed to preclude actuation of stem 156. Reservoir 184 is charged by means of bypass conduit 200 with pressure fluid from pipeline 114 when the fluid in pipeline 114 is at a predetermined normal operating pressure.

With the pressure of fluid in reservoir 184 equal to the pressure of fluid in pipeline 114, then the pressure in pipeline 114 is exerted through port 190 to retain valve member 198 seated on the bottom of chamber 188 against the pressure of fluid in reservoir 184 to seal off ports 192 and 194 and to prevent fluid communication between operator compartment 168 and reservoir 184. As long as valve member 198 is held against the bottom of chamber 188 and valve 202 is closed, reservoir 184 is completely sealed off thereby preventing escape of pressure fluid therein.

When the pressure in pipeline 114 falls below the pressure of the fluid in reservoir 184 the differential between the pressure of the fluids in pipeline 114 and the pressure in reservoir 184, upon reaching a predetermined magnitude, axially shifts valve member 198 off the bottom of chamber 188 and to a position near the top of chamber 188 thereby automatically providing for fluid communication between compartment 168 and reservoir 184 through conduit 196.

Introduction of pressure fluid into compartment 168 from reservoir 184 automatically rotates abutment 160 in a counterclockwise direction to the position shown in FIGURES 4 and 5 where it abuts stop 162. In this extreme counterclockwise position of abutment 160, stem 156 is turned so that passage 97 connects inlet port 90 with actuating port 92, and passage 98 connects exhaust port 95 with actuating port 94 thereby conditioning valve 88 for operating fluid motors 36 and 38 of FIGURE 1 to close valve 23.

With valve 118 normally conditioned to connect the pipeline circuit 107 with valve 88, the reducing pressure in pipeline 114 is transmitted through valve port 92 to cylinders 40 and 58. By energization of fluid motors 36 and 38, fluid in cylinders 42 and 56 is exhausted through valve 88 to reservoir 24 and pipeline valve stem 26 is turned in a clockwise direction to automatically close valve 23. In the event that there is a sudden and complete failure of pressure in pipeline 114, it will be appreciated that valve 88 is already automatically conditioned to power fluid motors 36 and 38 to close valve 23 in that no further manual effort is required to operate valve 88. Upon conditioning valve 118, pump 126 is manually operable to energize motor units 36 and 38 for closing valve 88 without further operation of valve 88 being required.

In the embodiment shown in FIGURE 7, valve 118 is replaced by an automatic double check valve 220 comprising a housing 222 forming a fluid chamber 224 which is connected at opposite ends to conduits 116 and 134 respectively. Ball valve members 225 and 226 are mounted in chamber 224 and are separated by a spring 228 which urges valve members 225 and 226 to a position where flow from conduits 134 and 116 into chamber 24 is interrupted. Thus, when the pressure in line 114 drops below a predetermined magnitude, valve member 226 can be opened by the fluid pressure resulting from actuation of pump 126. When the pressure of fluid in line 114 reaches its desired and necessary level, it causes valve member 225 to open thereby establishing fluid communication between conduits 116 and 122 for actuating the valve operator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination:
   (a) a pipeline conducting gas under pressure;
   (b) a valve assembly in the pipeline and comprising a casing providing a passage therethrough and a rotatable plug for blocking or permitting flow of gas through said passage;
   (c) a valve stem connected to said plug and projecting through said casing;
   (d) an operator assembly mounted on said casing and comprising a housing defining a liquid reservoir chamber;

9

(e) means on said housing providing at least two opposed motors containing movable pressure responsive elements;
(f) motion transmitting means in the housing connecting said elements with said valve stem;
(g) conduit means connecting said pipeline to said motors and a reversing valve in said conduit means for applying gas pressure from said pipeline to one or the other of said motors for selectively reversibly turning said valve stem;
(h) and auxiliary means for turning the valve stem in the event of gas pressure failure in the pipeline comprising a pump having an inlet connected to said liquid in the reservoir chamber;
(i) an outlet conduit for said pump;
(j) and a selector valve interposed in said conduit means and connected to said conduit for selectively blocking said conduit and transmitting pipeline gas pressure to said reversing valve or transmitting the liquid outlet pressure of said pump to said reversing valve.

2. In the combination defined in claim 1, means responsive to a drop in the pipeline gas pressure below a predetermined value for automatically conditioning said reversing valve to actuate said plug to pipeline closed position.

3. In the combination defined in claim 1, said selector valve being a spring biased check valve assembly that opens to the pipeline side of said conduit means or the outlet of said pump upon application of predetermined pressure from either.

4. In the combination defined in claim 1, said reversing valve comprising a valve member turnable between two angularly related positions, and an operator for conditioning said valve member to a selected operative position comprising a fluid pressure responsive device operably connected to said member.

5. In combination with a pipeline conducting gas under pressure and a valve assembly in the pipeline comprising a casing providing a passage therethrough;
  (a) a rotatable plug for blocking or permitting flow of gas through said passage and a stem connected to said plug and projecting through said casing;
  (b) an operator assembly adapted to be mounted on said casing and comprising a housing defining a liquid reservoir chamber;
  (c) means on said housing providing two opposed pairs of cylinders;
  (d) pistons in said cylinders and mechanism connecting corresponding pistons of each pair with said valve stem;
  (e) conduit means connecting said pipeline to said cylinders at the outer sides of said pistons and a reversing valve in said conduit means for applying gas pressure from said pipeline to one or the other of said pairs of pistons for selectively reversibly turning said valve stem;
  (f) and auxiliary means for turning the valve stem in the event of gas pressure failure in the pipeline comprising a pump having an inlet connected to said liquid in the reservoir chamber;

10

(g) an outlet conduit for said pump;
  (h) and a selector valve interposed in said conduit means and connected to said conduit for selectively blocking said conduit and transmitting pipeline gas pressure to said reversing valve or transmitting the liquid outlet pressure of said pump to said reversing valve.

6. In combination:
  (a) a pipeline conducting gas under pressure;
  (b) a valve assembly in the pipeline and comprising a casing providing a passage therethrough and a rotatable plug for blocking or permitting flow of gas through said passage;
  (c) a stem connected to said plug and projecting through said casing;
  (d) an operator assembly mounted on said casing and comprising a housing defining a liquid reservoir chamber surrounding said stem;
  (e) a gear on said stem within the said housing;
  (f) means on said housing providing two opposed pairs of cylinders opening at their inner ends into said reservoir;
  (g) pistons in said cylinders and racks connecting corresponding pistons of each pair with opposite sides of said gear;
  (h) conduit means connecting said pipeline to said cylinders at the outer sides of said pistons and a reversing valve in said conduit means for applying gas pressure from said pipeline to one or the other of said pairs of pistons for selectively reversibly turning said valve stem;
  (i) and auxiliary means for turning the valve stem in the event of gas pressure failure in the pipeline comprising a pump having an inlet connected to said liquid in the reservoir chamber, an outlet conduit for said pump, and a selector valve interposed in said conduit means and connected to said conduit for selectively blocking said conduit and transmitting pipeline gas pressure to said reversing valve or transmitting the liquid outlet pressure of said pump to said reversing valve.

References Cited in the file of this patent

UNITED STATES PATENTS

| | | |
|---|---|---|
| 1,454,396 | MacDonald | May 8, 1923 |
| 1,616,841 | Beebe | Feb. 8, 1927 |
| 2,300,694 | Overbeke | Nov. 3, 1942 |
| 2,396,984 | Broadston et al. | Mar. 19, 1946 |
| 2,512,119 | Stone et al. | June 20, 1950 |
| 2,628,476 | Grier | Feb. 17, 1953 |
| 2,643,677 | MacLean | June 30, 1953 |
| 2,937,622 | Brimhall | May 24, 1960 |
| 2,958,197 | Elliott | Nov. 1, 1960 |

FOREIGN PATENTS

| | | |
|---|---|---|
| 418,434 | Great Britain | Oct. 17, 1934 |
| 604,168 | Canada | Aug. 30, 1960 |
| 1,241,284 | France | Aug. 8, 1960 |